(Model.)

J. L. BORSCH.
SPECTACLES.

No. 272,521. Patented Feb. 20, 1883.

WITNESSES:
H. B. Brown
E. H. Bond

INVENTOR
J. L. Borsch
By T. J. W. Robertson
ATTORNEY.

UNITED STATES PATENT OFFICE.

JOHN L. BORSCH, OF PHILADELPHIA, PENNSYLVANIA, ASSIGNOR OF ONE-HALF TO EDWARD HAZLEHURST, OF SAME PLACE.

SPECTACLES.

SPECIFICATION forming part of Letters Patent No. 272,521, dated February 20, 1883.

Application filed October 17, 1882. (Model.)

*To all whom it may concern:*

Be it known that I, JOHN L. BORSCH, a citizen of the United States of America, residing at Philadelphia, in the county of Philadelphia and State of Pennsylvania, have invented certain new and useful Improvements in Spectacles and Eyeglasses, of which the following is a specification, reference being had therein to the accompanying drawings.

This invention relates to certain improvements in spectacles; and it consists in peculiar nose-pieces, preferably formed of flexible material, adapting them to be bent by the optician to conform to the shape of the nose, whereby the bridge is supported in an elevated position and the spectacles held by the bows extending over the ears, without the bridge resting on the nose or pressure on the side thereof other than the weight of the spectacles, all as will be hereinafter more fully set forth.

Eyeglasses have been provided with nose-pieces for supporting the bridge above the nose; but by reason of the pressure of said nose-pieces on the side of the nose, caused by the tension of the bridge, they are objectionable, and many persons cannot wear them on account of the shape of their noses, and therefore wear ordinary spectacles, which are also very objectionable in use, for the reason that the bridge connecting the two lens-frames rests on the nose, producing an unsightly mark across the front thereof, and the lenses come in contact with the eyelashes by improper adjustment on the nose, or when the head is inclined backward, as well as for many other reasons cognizant to a person wearing spectacles.

My invention is particularly designed to obviate the aforesaid objections as well as provide many advantages over the common spectacles now in use, and to this end I have devised a pair of spectacles constructed as will be hereinafter fully described, reference being had to the accompanying drawings, forming part of this specification, in which—

Figure 1:
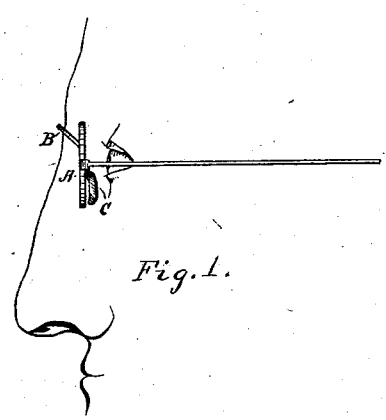
Figure 2:
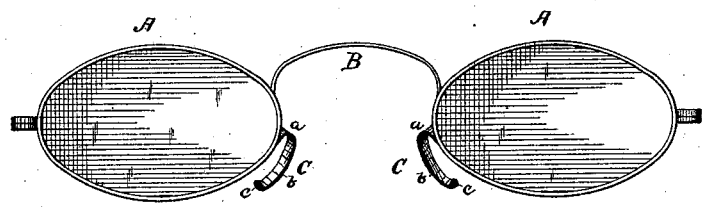

Figure 1 is a view showing part of a face in side elevation, with my spectacles resting on the nose. Fig. 2 is a front view, enlarged, showing the peculiar bend and angle of the nose-rests.

The lens-frames A A may be of any well-known form. These frames I connect by a stiff bridge, B, extending up over the nose, as shown in Fig. 1 of the drawings, and not resting on the nose at any place. The nose-pieces form rests for the spectacles on the side of the nose, as well as support the bridge, without pressure on the nose other than the weight of the spectacles, which latter are held by bows of any desired construction extending back over the ears, as in the common spectacles now in use.

The bridge B may form an integral part of the lens-frames or be brazed or soldered thereto. The nose-rests C C may be secured in a like manner to the bridge, or form an integral part of the lens-frames, or may be made separate therefrom and attached in any convenient manner. They are preferably curved upward at *a*, and then downward at *b*, and then under, with the ends *c* forming a shorter curve, the part *b* setting at an angle to the frame of the lenses, as shown in Fig. 2, thus conforming to the shape of the nose, as well as insuring the spectacles being properly held without pressure on the sides of the nose, as is the case with the common eyeglasses, and by the bows extending over the ears supporting the bridge above the nose, instead of its resting on the front thereof and making an unsightly mark, as in the case with a pair of common spectacles. These nose-pieces will be found to have additional advantages in case a person's nose is crooked, or should he have the center of the pupils of his eyes at different distances from the center of the nose, which is often the case, the optician can readily fit him by bending one or both of the nose-pieces to suit the person desiring the spectacles.

Besides the above points of superiority over the common spectacles and eyeglasses now in use, spectacles having my nose-pieces are very convenient for children or others in which the nose has been but little developed at the top, who cannot therefore wear ordinary spectacles, as they slip down for want of proper support.

What I claim as new is—

1. In a pair of spectacles, and in combination with the bows thereof, a pair of nose-pieces constructed to prevent the bridge bearing on the nose, and having their inner sides inclined toward the eyes to conform to the shape of the nose, substantially as described.

2. The combination, with the lens-frames and the bows of a pair of spectacles, of the bridge B, extending up over and not touching the nose, and nose-pieces C C, constructed to bear on the sides of the nose without squeezing it, substantially as described.

In testimony whereof I affix my signature, in presence of two witnesses, this 16th day of October, 1882.

JOHN L. BORSCH.

Witnesses:
F. O. McCLEARY,
T. J. W. ROBERTSON.